US011496724B2

(12) United States Patent
Barenbrug et al.

(10) Patent No.: US 11,496,724 B2
(45) Date of Patent: Nov. 8, 2022

(54) OVERSCAN FOR 3D DISPLAY

(71) Applicant: ULTRA-D COÖPERATIEF U.A., Eindhoven (NL)

(72) Inventors: Bart Gerard Bernard Barenbrug, Waalre (NL); Peter Roelen, Helmond (NL)

(73) Assignee: ULTRA-D COÖPERATIEF U.A., Eindhoven (NL)

( * ) Notice: Subject to any disclaimer, the term of this patent is extended or adjusted under 35 U.S.C. 154(b) by 0 days.

(21) Appl. No.: 16/970,201

(22) PCT Filed: Jan. 23, 2019

(86) PCT No.: PCT/EP2019/051617
§ 371 (c)(1),
(2) Date: Aug. 14, 2020

(87) PCT Pub. No.: WO2019/158327
PCT Pub. Date: Aug. 22, 2019

(65) Prior Publication Data
US 2021/0084286 A1 Mar. 18, 2021

(30) Foreign Application Priority Data
Feb. 16, 2018 (EP) .................................... 18157068

(51) Int. Cl.
*H04N 13/305* (2018.01)
*H04N 13/128* (2018.01)
(Continued)

(52) U.S. Cl.
CPC ......... *H04N 13/305* (2018.05); *H04N 13/111* (2018.05); *H04N 13/122* (2018.05); *H04N 13/128* (2018.05)

(58) Field of Classification Search
CPC .. H04N 13/305; H04N 13/128; H04N 13/122; H04N 13/111
(Continued)

(56) References Cited

U.S. PATENT DOCUMENTS 6,064,424 A 5/2000 Van Berkel et al.
8,588,514 B2 11/2013 Barenbrug
(Continued)

FOREIGN PATENT DOCUMENTS

EP 2 410 753 1/2012
EP 2 463 853 6/2012
(Continued)

OTHER PUBLICATIONS

International Search Report and Written Opinion of the ISA for PCT/EP2019/051617 dated Apr. 8, 2019, 14 pages.
(Continued)

*Primary Examiner* — Joseph G Ustaris
*Assistant Examiner* — Jimmy S Lee
(74) *Attorney, Agent, or Firm* — Nixon & Vanderhye, P.C.

(57) ABSTRACT

A display processor and computer-implemented method are provided for processing three-dimensional [3D] image data for display on a 3D display. The 3D display is arranged for emitting a series of views of the 3D image data which enables stereoscopic viewing of the 3D image data at multiple viewing positions. The series of views may be displayed on the 3D display using overscan. The degree of overscan may be determined as a function of one or more depth range parameters, the one or more depth range parameters characterizing, at least in part, a degree of depth perceived by a viewer when the series of views is displayed on the 3D display.

17 Claims, 4 Drawing Sheets

(51) Int. Cl.
*H04N 13/122* (2018.01)
*H04N 13/111* (2018.01)

(58) Field of Classification Search
USPC .......................................................... 348/43
See application file for complete search history.

(56) References Cited

U.S. PATENT DOCUMENTS

| | | | |
|---|---|---|---|
| 9,251,564 B2 | 2/2016 | Verdier et al. | |
| 9,681,113 B2 | 6/2017 | Redmann | |
| 9,786,253 B2* | 10/2017 | Raymond | H04N 13/305 |
| 2005/0185048 A1* | 8/2005 | Ha | H04N 13/282 |
| | | | 348/42 |
| 2011/0025822 A1* | 2/2011 | Naske | H04N 13/111 |
| | | | 348/44 |
| 2011/0193945 A1 | 8/2011 | Tsuchida | |
| 2012/0050502 A1* | 3/2012 | Chi | H04N 13/398 |
| | | | 348/51 |
| 2012/0099836 A1 | 4/2012 | Welsh et al. | |
| 2012/0162775 A1* | 6/2012 | Francois | H04N 13/344 |
| | | | 359/630 |
| 2013/0147928 A1* | 6/2013 | Woo | H04N 13/128 |
| | | | 348/51 |
| 2013/0163855 A1 | 6/2013 | Mathur | |
| 2013/0187910 A1* | 7/2013 | Raymond | H04N 13/31 |
| | | | 345/419 |
| 2013/0307928 A1 | 11/2013 | Choe et al. | |
| 2015/0304640 A1 | 10/2015 | Brooks | |

FOREIGN PATENT DOCUMENTS

| | | |
|---|---|---|
| GB | A-2196166 | 4/1988 |
| KR | 10-2012-0140425 | 12/2012 |
| WO | 2011/005544 | 1/2011 |
| WO | 2011/123177 | 10/2011 |

OTHER PUBLICATIONS

C. van Berkel et al. entitled "Multiview 3D—LCD" published in SPIE Proceedings vol. 2653, 1996, pp. 32 to 39 and in GB-A-2196166.

* cited by examiner

OVERSCAN FOR 3D DISPLAY

This application is the U.S. national phase of International Application No. PCT/EP2019/051617 filed Jan. 23, 2019 which designated the U.S. and claims priority to European Application No. 18157068.0 filed Feb. 16, 2018, the entire contents of each of which are hereby incorporated by reference.

FIELD OF THE INVENTION

The invention relates to a display processor and a computer-implemented method for processing three-dimensional [3D] image data for display on a 3D display. The invention further relates to a 3D display comprising the display processor, and to a computer readable medium comprising transitory or non-transitory data representing instructions arranged to cause a processor system to perform the method.

BACKGROUND ART

Increasingly, display devices such as televisions, digital photo frames, tablets and smartphones comprise 3D displays to provide a user with a perception of depth when viewing content on such a device. For that purpose, such 3D display devices may, either by themselves or together with glasses worn by the user, provide the user with different images in each eye so as to provide the user with a perception of depth based on stereoscopy, e.g., a stereoscopic perception of depth.

3D display devices typically use content which contains depth information in order to establish the content on screen as having a degree of depth. The depth information may be provided implicitly in the content. For example, in the case of so-termed stereoscopic content, the depth information is provided by the differences between a left and a right image signal of the stereo content. Together, the left and right image signal thus constitute a stereoscopic 3D image signal. The depth information may also be provided explicitly in the content. For example, in content encoded in the so-termed image+depth format, the depth information is provided by a 2D depth signal comprising depth values which are indicative of distances that objects within the 2D image signal have towards a camera or viewer. Instead of depth values, also disparity values may be used, e.g., the 2D depth signal may be a 2D disparity signal, or in general, a 2D depth-related signal. Techniques are known to generate a 2D depth-related signal from a stereo 3D image signal, e.g., for view synthesis for autostereoscopic displays.

These autostereoscopic displays provide said stereoscopic perception of depth without needing the viewer to wear polarized, color-filter-based or shutter-based glasses. For that purpose, optical components are used, such as lenticular lens arrays (or more general lenticular or barrier means), which enable the display to emit a viewing cone from each given point on the 3D display, the viewing cone comprising at least a left view and a right view of a scene. This enables the viewer to see a different image with each eye when positioned accordingly within the viewing cone. Certain autostereoscopic displays, sometimes referred to as auto-multiscopic displays, provide multiple views of the same scene, rather than only a left and a right view. This allows the viewer to assume multiple positions in the viewing cone, e.g., move left-right in front of the display, while still obtaining a stereoscopic perception of the scene, and also experiencing motion parallax.

Examples of such autostereoscopic displays are described in a paper by C. van Berkel et al. entitled "Multiview 3D—LCD" published in SPIE Proceedings Vol. 2653, 1996, pages 32 to 39 and in GB-A-2196166. In these examples the autostereoscopic display comprises a matrix LC (liquid crystal) display panel which has rows and columns of pixels (display elements) and which acts as a spatial light modulator to modulate light from a light source. The display panel may be of the kind used in other display applications, for example computer display screens for presenting display information in two-dimensional form. A lenticular sheet, for example in the form of a molded or machined sheet of polymer material, may overlay the output side of the display panel with its lenticular elements, comprising (semi) cylindrical lens elements, extending in the column direction with each lenticular element being associated with a respective group of two, or more, adjacent columns of display elements and extending in a plane that runs parallel with the display element columns. In an arrangement in which each lenticule is associated with two columns of display elements, the display panel may be driven to display a composite image comprising two 2D sub-images vertically interleaved, with alternate columns of display elements displaying the two images, and the display elements in each column providing a vertical slice of the respective 2D (sub) image. The lenticular sheet directs these two slices, and corresponding slices from the display element columns associated with the other lenticules, to the left and right eyes respectively of a viewer in front of the sheet so that, with the sub-images having appropriate binocular disparity, the viewer may perceive a single stereoscopic image. In other, multi-view, arrangements, in which each lenticule is associated with a group of more than two adjacent display elements in the row direction and corresponding columns of display elements in each group are arranged appropriately to provide a vertical slice from a respective 2-D (sub-) image, then as a viewer's head moves a series of successive, different, stereoscopic views are perceived for creating, for example, a look-around impression.

Autostereoscopic displays of above kind may be used for various applications, for example in home or portable entertainment, medical imaging and computer-aided design (CAD).

Autostereoscopic displays are often said to provide a window on the (virtual) world that is displayed on them. In the case of an autostereoscopic display, the motion parallax provided by such a display may allow the viewer to look around the bezel, assuming the scene is displayed behind the display plane. The latter is often the case in 3D displays to avoid so-called window violations. Since content is often converted from existing content, and distributed in standard resolutions with an aspect ratio that matches the display, such as 16:9, the part of the scene that would become visible by looking around the corner of the bezel is not present in the source video.

One option is to treat this as any de-occlusion would be treated, e.g., by extrapolating or in another manner estimating what would become visible from the available image data, often by repeating background information.

Another option may be to stretch the content relative to the display plane, e.g., horizontally, or both horizontally and vertically, so that the outer edges of the stretched video only become visible when 'looking around the corner'. This principle is conceptually the same as the principle of 'overscan' known from television and broadcast television, and is in the following also simply referred to as overscan.

SUMMARY OF THE INVENTION

The inventors have recognized that a drawback of applying overscan to 3D image data is that the stretching may lead to a scale factor slightly above 1.0 which is to be applied to the image data, which may lead to (very) low-frequent aliasing caused by the slow variation in the phase used for the interpolation of the image data. This has been found not to be greatly disturbing when the 3D content contains significant depth, since the variation in parallax disturbs and thereby reduces the visibility of this very low-frequent pattern. However, when content is relatively flat, e.g., contains little depth information, the display quality of the content may be degraded as there may be no or too little parallax variation which may otherwise reduce the visibility of the aliasing.

Another drawback is that the degree of overscan may have to be selected to be relatively large to handle a scene containing a significant amount of depth, e.g., to avoid having to extrapolate content in such a worst-case situation. Accordingly, the degree of overscan may be selected to be higher than needed for average content. One of the objects of the invention is to obtain an improved overscan for a 3D display which addresses at least one of the abovementioned problems.

A first aspect of the invention provides a display processor for processing three-dimensional [3D] image data for display on a 3D display, the 3D display being arranged for adjacently emitting a series of views of the 3D image data, the series of views enabling stereoscopic viewing of the 3D image data at multiple viewing positions, wherein the display processor is configured to:
  generate the series of views of the 3D image data; and
  determine a degree of overscan to be used for displaying the series of views on the 3D display as a function of one or more depth range parameters, the one or more depth range parameters characterizing, at least in part, a degree of depth perceived by a viewer when the series of views is displayed on the 3D display.

A further aspect of the invention provides a 3D display comprising the display processor.

A further aspect of the invention provides a computer-implemented method of processing three-dimensional [3D] image data for display on a 3D display, the 3D display being arranged for adjacently emitting a series of views of the 3D image data, the series of views enabling stereoscopic viewing of the 3D image data at multiple viewing positions, wherein the method comprises:
  generating the series of views of the 3D image data; and
  determining a degree of overscan to be used for displaying the series of views on the 3D display as a function of one or more depth range parameters, the one or more depth range parameters characterizing, at least in part, a degree of depth perceived by a viewer when the series of views is displayed on the 3D display. A further aspect of the invention provides a computer readable medium comprising transitory or non-transitory data representing instructions arranged to cause a processor system to perform the method.

The above measures involve selecting the degree of overscan which is to be used when displaying the 3D image data on an autostereoscopic 3D display which provides stereoscopic viewing of the 3D image data at multiple viewing positions. Such 3D displays are known per se, and may employ lenticular lens arrays to redirect the light emitted by the 3D display to provide a series of views of a scene represented by the 3D image data to a viewer in what is typically referred to as a viewing cone. Some displays may emit such series of views in each of a series of repeated viewing cones. As is known per se in the art, such series of views may be generated by a display processor based on the 3D image data. For example, in case the 3D image data comprises, or is comprised of, 2D image data and depth-related data, the views may be generated by view rendering or view synthesis techniques. In general, generating such views may involve a known 'weaving' or 'interdigitation' step in which it is determined for each (sub-)pixel of the display which image data from which view is to be displayed by the (sub-)pixel. The output may resemble a 'weaving' of subsampled image data of the respective views. It is noted that the weaving may be performed as additional step, e.g., after the series of views has been generated, or as an integral part thereof. The latter case may involve first determining which view is to be shown by a particular sub-pixel, after which only the image data of the view for the particular sub-pixel is rendered or synthesized (and likewise for all other (sub-)pixels associated with the view), instead of first rendering or synthesizing the view for all (sub-)pixels and then selecting a subset of the image data of said view during the weaving.

Since such types of 3D displays effectively enable a viewer to 'look around' the bezels of the 3D display, it may be desirable to apply overscan to the 3D image data so as to avoid de-occlusion artifacts in such cases. This overscan may for example involve presenting for a middle view of a viewing cone a centrally cropped view of the scene, and using the surrounding 'cropped-out' image data to fill-in de-occlusion areas in other views within the viewing cone. Such type of cropping of 3D image data is illustrated in FIG. 3A, but other types of cropping are equally conceivable. The degree of overscan is then selected adaptively, namely based on one or more depth range parameters which characterize, at least in part, a degree of depth perceived by a viewer when the series of views is displayed on the 3D display. As also elucidated in the various embodiments of the invention, such parameters may take various forms, but may generally express the degree of which the viewer is able to 'look around' the bezels of the 3D display, and thereby, the degree of de-occlusion in case no overscan is applied. The inventors have devised to select the degree of overscan adaptively based on these one or more depth range parameters. For example, if the depth range parameter indicates a relatively large depth, and thereby a relatively high risk of de-occlusion at the bezels, a relatively large overscan may be selected, whereas if the depth range parameter indicates a relatively small depth, and thereby a relatively low risk of de-occlusion at the bezels, a relatively small overscan may be selected.

Advantageously, the occurrence of de-occlusion artifacts may be avoided or at least reduced. Such de-occlusion artifacts may be caused by the image data not being 'filled-in' by extrapolation or other means, or by such 'filling-in' being imperfect, thereby causing image artifacts. At the same time, the degree of overscan may be kept to a minimum actually necessitated in view of the depth presented by the scene. Optionally, the 3D image data comprises two-dimensional [2D] image data and depth-related data, wherein the one or more depth range parameters comprise one or more mapping parameters defining a mapping to be applied to the values of the depth-related data when generating the series of views of the 3D image data, wherein the degree of overscan is determined based on said one or more mapping parameters.

In case of the 3D image data comprising, or being comprised of, 2D image data and depth-related data, the views may be generated by view rendering or view synthesis techniques which are known per se in the art of autostereoscopic 3D displays, and which techniques map the depth-related values to parallax shift values by which image data of the 2D image data may be locally displaced across the series of views. Such mapping may be parameterized, or at least may be determined in part by one or more mapping parameters which may affect the degree of depth perceived by a viewer when the series of views is displayed on the 3D display. For example, the mapping may comprise a gain parameter and an offset parameter which are applied to a depth value when mapping the depth value to a parallax shift value during view rendering. Such a gain parameter may affect the magnitude of depth differences within the scene, e.g., correspond to a depth gain factor, whereas the offset parameter may affect the forward/backward placement of the entire scene with respect to the display plane, e.g., correspond to a depth offset value. Both parameters may affect the degree of de-occlusion at the bezels of the display. Accordingly, the degree of overscan may be adaptively adjusted based on either or both of said mapping parameters.

For example, the display processor may be configured to determine the degree of overscan as a function of the product of a nominal overscan value and the gain parameter. Effectively, the gain parameter may be used to modulate a nominal overscan value. Here, the adjective 'nominal' may refer to a value having been preselected, e.g., by the value being a factory default value or being obtained by calibration, etc. In addition or alternatively, the display processor may be configured to determine the degree of overscan as a sum of said product and an absolute value of the offset parameter. Here, a zero value of the offset may be assumed to cause the display processor to perform no ('zero') forward/backward displacement of the scene, whereas a non-zero value may cause the display processor to perform a displacement as a function of the sign and magnitude of said value of the offset parameter. The amount of negative or positive offset may contribute to the degree of overscan. Various other ways of determining the degree of overscan as a function of the gain parameter and/or the offset parameter are equally conceivable.

Optionally, the one or more depth range parameters comprise one or more content parameters which are indicative of a depth range of the content of the 3D image data. In addition or alternatively to the use of mapping parameters, also content parameters may be used to determine the degree of overscan. Such content parameters may be indicative of the depth range of the content of the image data, for example, by representing a measurement or estimate thereof. For example, such content parameters may be generated as metadata to the 3D image data and may specify, for specific images or a temporal fragment such as a video shot, the depth range of the content. This depth range may be specifically specified for the purpose of adapting the overscan, and in some cases be based on aesthetic considerations, e.g., of a content author, rather than the mere measurement of depth range.

In accordance with the abstract of the present specification, a display processor and computer-implemented method are provided for processing three-dimensional [3D] image data for display on a 3D display. The 3D display is arranged for emitting a series of views of the 3D image data which enables stereoscopic viewing of the 3D image data at multiple viewing positions. The series of views may be displayed on the 3D display using overscan. The degree of overscan may be determined as a function of one or more depth range parameters, the one or more depth range parameters characterizing, at least in part, a degree of depth perceived by a viewer when the series of views is displayed on the 3D display.

It will be appreciated by those skilled in the art that two or more of the above-mentioned embodiments, implementations, and/or aspects of the invention may be combined in any way deemed useful.

Modifications and variations of the method and any generated data which correspond to the described modifications and variations of the display processed can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
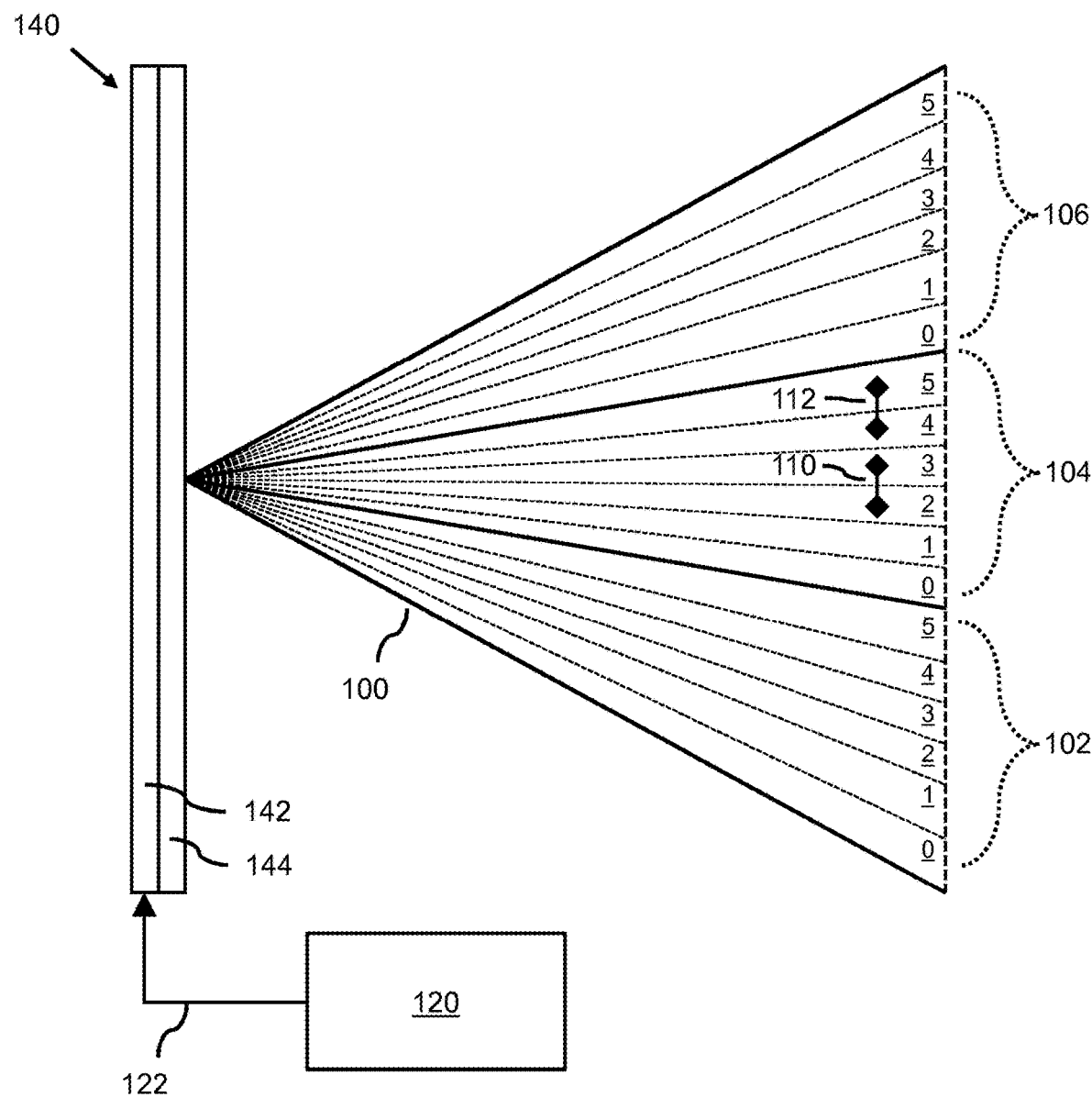
FIG. 1 shows a display processor and a 3D display for adjacently emitting a series of views in each of a series of viewing cones.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

0-5 series of views
100 series of repeated viewing cones
102-106 viewing cones
110 first viewing position
112 second viewing position
120 display processor
122 data representing series of images
140 3D display
142 light generating portion
144 optical means
200 2D image
210 depth map
220 view at second viewing position without overscan
222 de-occlusion artifacts
224 measure of degree of overscan 230 view at second viewing position with overscan
300 method for processing 3D image data
310 determining degree of overscan
320 generating series of view
350 computer readable medium
360 non-transitory data representing instructions

DETAILED DESCRIPTION OF EMBODIMENTS

FIG. 1 shows a display processor 120 which is connected to a 3D display 140 and configured for providing a series of images, e.g., in the form of display data 122, to the 3D display. The 3D display 140 is an autostereoscopic 3D display for enabling stereoscopic viewing of content displayed thereon without a need for the user to wear glasses. The 3D display 140 comprises a light generating portion 142 which is typically comprised of an array of light emitting or light modulating elements. For example, the light generating portion 142 may be formed by a Liquid Crystal Display (LCD) panel and a backlight, as is known from the technical field of displays.

The 3D display 140 further comprises optical means 144 for redirecting light generated by the light generating portion 142 into different directions. The light generating portion 142 may be suitably arranged and cooperative with the optical means 144 such that a series of views 0-5 are emitted from the 3D display 140 in the form of a viewing cone 104. Moreover, the 3D display 140 may be arranged for, when being provided with a series of images 122, adjacently emitting said images in the series of views 0-5. Thus, the viewer will perceive, when viewing one of the series of views 0-5, a respective one of the series of images 122. The series of images 122 may correspond to a camera facing a scene comprised in 3D image data and moving from left to right in front of, and relative to, said scene. Hence, a viewer positioned at viewing position 110 within the viewing cone 104 may perceive two different ones 2, 3 of the series of views 0-5 and thereby may obtain stereoscopic viewing of said scene.

It is noted that 3D displays of the above configuration, and the manner of processing a series of images 122 for display as the series of views 104, are in itself known. For example, U.S. Pat. No. 6,064,424 discloses an autostereoscopic display apparatus having lenticular elements as optical means 144 and discusses the relationship between display elements and the lenticular elements. Also, autostereoscopic displays are known which comprise so-termed parallax barriers as optical means 144.

FIG. 1 shows the viewing cone 104 being a central viewing cone of a series of repeated viewing cones 100, with each of the viewing cones 102, 104, 106 comprising the series of views 0-5. The viewing cone 104 being repeated may be a desired as well as inherent property of the optical means 144 of the 3D display 140. The repeating of viewing cones is also discussed in the aforementioned U.S. Pat. No. 6,064,424. The viewer is shown in FIG. 1 at two viewing positions 110, 112. In a first viewing position 110, the viewer perceives a view 2 with his left eye while perceiving a view 3 with his right eye. Due to the aforementioned correspondence of the series of images 122 to a camera moving from left to right in front of, and relative to, a scene, the viewer will obtain stereoscopic viewing at the first viewing position 110. In a second viewing position 112 further to the right-hand side of the viewing cone 104 (from the perspective of the viewer), the viewer perceives a view 4 with his left eye while perceiving a view 5 with his right eye. The viewer will thus also obtain stereoscopic viewing at the second viewing position 112, but will be provided with another perspective of the scene, e.g., corresponding to a (stereo) camera positioned towards the right in front of, and relative to, the scene than at the first viewing position 110.

Figure 2A:
FIG. 2A shows an example of a 2D image showing a scene.
Figure 2B:
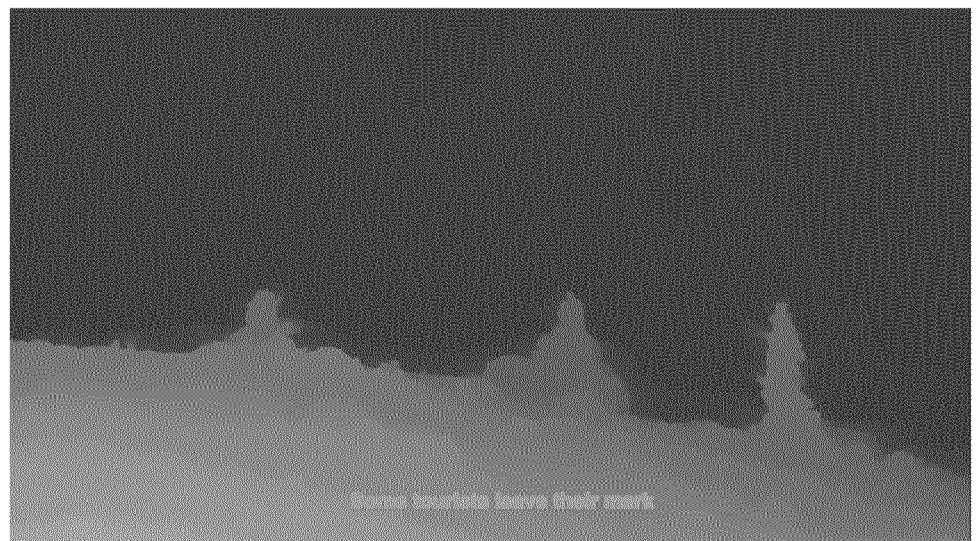
FIG. 2B shows a depth map corresponding to the 2D image.

FIG. 2A shows a 2D image 200 of a scene, while FIG. 2B shows a depth map 210 of the scene. Together, the 2D image 200 and the depth map 210 may represent 3D image data which may be used by the display processor to perform view rendering for the 3D display. The depth map 210 is reproduced such in FIG. 2B that the intensity of the depth map is inversely proportionate to a distance to the viewer, e.g., a higher intensity corresponds to being closer to the viewer, and a lower intensity corresponds to being further away from the viewer. In this example, the entire scene may be intended to be displayed behind the display plane, e.g., the depth values themselves may represent a far distance, and/or the mapping of the depth values to the display domain may cause the scene to be rendered behind the display plane.

Effectively, the 3D display may appear to the viewer to be a window behind which the scene of FIG. 2A is displayed. If the 2D image 200 and the depth map 210 are used for view rendering without overscan, this means that de-occlusion may occur at the bezels of the 3D display when the viewer 'looks around' the bezels, e.g., by the viewer moving his/her head in front of the 3D display, e.g., towards the right or left.

In this respect, it is noted that in the above and following, the term 'depth map' refers to depth data which is arranged in rows and columns. Moreover, the adjective 'depth' is to be understood as being indicative of the depth of portions of an image to the camera. Therefore, the depth map may be constituted by depth values, but also by, e.g., disparity values or parallactic shift values. Essentially, the depth map may therefore constitute a disparity map or a parallactic shift map. Here, the term disparity refers to a difference in position of an object when perceived with a left eye or a right eye of the user. The term parallactic shift refers to a displacement of the object between two views so as to provide said disparity to the user. Disparity and parallactic shift are generally negatively correlated with distance or depth. Device and methods for conversion between all of the above types of maps and/or values are known.

Figure 3A:
FIG. 3A illustrates a view at a particular viewing position without overscan.
Figure 3B:
FIG. 3B illustrates a view at the viewing position with overscan applied.

FIGS. 3A and 3B illustrate the overall concept of overscan in view rendering. FIG. 3A shows a view 220 of the scene represented by the 2D image 200 of FIG. 2A and the depth map 210 of FIG. 2B, as it may appear to a viewer when viewing view 5 of a viewing cone 102-106 of FIG. 1. It can be seen that due to the scene being generally located behind the display plane, and the viewer being located at a right-most side of the viewing cone and thus effectively being able to 'look around' the left bezels of the display, de-occlusion artifacts 222 appear at the left-hand side of the view 220.

FIG. 3B illustrates a view 230 of the scene at the second viewing position 112 of FIG. 1, in which overscan is applied to the generated view. For example, such overscan may be applied by cropping the side(s) of the image data of the view, and scaling the cropped image data to the desired dimensions, e.g., of the image data before cropping. FIG. 3B shows such overscan by horizontal cropping and horizontal scaling. However, as also indicated elsewhere in this specification, overscan may also be applied in both the horizontal and vertical direction, or only horizontally or vertically.

In this respect, it is noted that FIG. 3A also illustrates a measure 224 of the degree of overscan, being in this case a cropping distance in pixels, e.g., along the horizontal and/or vertical direction (FIG. 3A only shows horizontal). Various other quantifications of the degree of overscan are equally conceivable.

This degree of overscan may be determined in various ways. A first example is to analyze the depth range within of the content itself, and determine how much overscan is needed to render the content with enough 'look-around' image data remaining at the borders of the image. For example, the absolute depth and depth variation of the content at the image borders may be analyzed. Such analysis may be performed by the display processor, but also by a third party, e.g., by a content author or content provider. The latter may analyze the content in an offline manner, e.g., by analyzing whole temporal fragments such as video shots, and then determining the necessary overscan per temporal fragment. This may ensure temporal stability compared to a dynamic variation of the degree of overscan per image (video frame). A parameter representing a determined amount of overscan may be transmitted as meta-data along with the content, e.g., the 3D image data. Additionally or alternatively, the depth range of a video shot may be transmitted at the start of the video shot.

Additionally or alternatively to the above-described determination of the degree of overscan, said overscan may also made dependent on mapping parameters used in autostereoscopic displays which indicate the amount and forward/backward positioning of depth. This amount and positioning may in a 3D display be controlled by user using a 'factor' and 'offset' control function, with the 'factor' representing a gain factor. Such controls typically have a direct effect on the amount of disparity which is presented on the display and therefore on the degree of overscan which is needed.

For example, the degree of overscan may be determined as a nominal overscan which represents an (optimal) trade-off between amount of distortion due to stretching and the degree of de-occlusion at the bezels of the display, e.g., for average content at default factor (e.g., 100%, corresponding to a gain of 1.0) and default offset (e.g., 0, which may be defined relative to a 'neutral' display depth at display plane). The actual overscan may then be based on the nominal overscan adjusted to the current settings of the factor and offset, e.g., as selected by the user or automatically.

For example, in the extreme case of the factor being 0 and the offset being 0, the scene becomes flat and is displayed at the display plane, and no overscan is needed. However, if the factor is doubled to 200%, then any scene behind the display may need twice as much overscan. As such, the nominal overscan n may be multiplied by the factor f (assumed to be normalized) to arrive at the actual overscan a:

$a = f * n$

The factor f may be a combination of a user-controlled factor $f_u$ (which may have a range which may be suitably selected for the user, e.g., with 100% corresponding to the nominal depth a given display may show) and a display-specific factor $f_s$ which for a specific type of display may determine how the user setting is scaled to the nominal depth. The latter setting may be used to ensure that for different types of displays, which may need a different amount of disparity (in terms of number of pixels of parallax shift) to be generated (e.g., more or fewer pixels of disparity depending on the resolution, or the DPI, of the display), the user setting 100% may provide an adequate amount of depth. In some embodiments, $f_s$ may already be taken into account in the nominal overscan, since both are one-time settings relating to the specifics of the display and the trade-offs made for optimal performance. In other embodiments, $f_s$ may not be taken into account in the nominal overscan, but a change in $f_s$ with respect to a nominal $f_s^n$ may be taken into account as follows:

$a = f_u * f_s / f_s^n * n$

Next to the factor, another mapping parameter may be the offset o which effectively pulls the scene forward or pushes the scene backward with respect to a neutral display depth. Assuming that the depth range, at least in terms of the amount of disparity generated in front of the display (negative disparity) or behind the display (positive disparity), is symmetrical with respect to the display plane, applying an offset may increase the maximum disparity that can be generated, irrespective of whether the offset is positive or negative. Accordingly, the absolute value of the offset may be added to the above term when determining the degree of overscan:

$a = f_u * f_s / f_s^n * n + |o|$

Here, o may be scaled so that an absolute value of 1 corresponds to the maximum disparity magnitude for the nominal factor. Depending on the order in which the factor and offset are applied to the depth values, one may also use:

$a = f_u * f_s / f_s^n * (n + |o|)$

Yet another option, which again assumes that the offset is normalized, is to also apply the offset via a multiplication factor:

$a = f_u * f_s / f_s^n * (1 + |o|) * n$

Alternatively, only an offset causing image content to be positioned behind the display plane may be considered, e.g., by not taking the absolute value of the offset but by rather clipping the offset to a range by which the scene is moved backward, and thereby using zero instead of the absolute value of the offset for offsets that pull the scene closer to the viewer. However, even though it is not a de-occlusion per se, also content placed in front of the display plane may provide a need for fill-in, as more of the foreground object should become visible when looking from the side (even though this constitutes a window violation). As such, it may be preferred to use the absolute value of the offset rather than using said clipping.

As indicated earlier, metadata may be provided for the 3D image data, which may indicate a content-dependent scaling factor for the overscan, e.g., to enable a content author or content provider to influence the amount of overscan during display. If such metadata is available to the display processor, the content-dependent scaling factor may be used as a(nother) scaling factor for the nominal overscan. Additionally or alternatively, metadata may be provided which indicates a depth range of the content. This metadata may be used to refine the scaling of the nominal overscan. For example, a video shot that has a small depth range may not need a significant amount of overscan, even if the factor or offset are high, and conversely, content that has a very large depth range may need a large overscan even when the factor or offset are set to nominal. Given a $d^-$ and $d^+$ (minimum and maximum depth range, expressed as disparity values), the amount of depth relative to the current offset may be computed as $\max(|d^+ - o|, |o - d^-|)$, where in this case, the offset may be still in the same range as the depth, which may be normalized (as above) if the depth is also normalized and centered around screen depth. The ratio of this number compared to a nominal amount of depth $d^n$ for which the nominal overscan was determined may be used to compute the scaled actual overscan:

$a = f_u * f_s / f_s^n * \max(|d^+ - o|, |o - d^-|) / d^n * n.$

If meta-data is available indicating the depth range, one may assume $d^+ = d^n$ and $d^- = -d^n$, in which case the above formula reverts to the previous version with the offset accounted for as multiplication factor, assuming offset o is normalized with respect to the nominal depth range, and interpreted such that the value zero corresponds to a depth corresponding to the display plane for the values of $d^-$, $d^+$ and $d''$ as well. Note that there are variations of the above formula, e.g., which may take into account that neither the depth values nor the offset may be centered around 0. In general, the above formula assumes that the depth values already represent disparity/parallax. If the depth values rather represent the distance from the viewer, the formulas should be modified to take into account the 1/x relation between distance and disparity. Such conversion is known per se in the field of 3D displays and processing.

It is noted that, in general, the overscan may be applied in a manner in which the aspect ratio of the content is preserved, e.g., equally in horizontal and vertical direction. Alternatively, the overscan may only be applied horizontally or vertically, which may (slightly) modify the aspect ratio of the content. In general, the overscan may be applied equally to either side of the content along each respective direction, e.g., to the left and the right in the horizontal direction and to the top and the bottom in the vertical direction, but also to selected ones from the four sides (left, right, top, bottom), and/or in an unequal manner to different ones of the four sides. If a parameter representing a determined amount of overscan is made available, e.g., as metadata, the parameter may define the overscan in accordance with the above.

The overscan may be applied by cropping the side(s) of the image data of the generated views, and scaling the cropped image data to the desired dimensions, e.g., of the image data before cropping. Effectively, the overscan may be applied to the generated views. Alternatively, the overscan may be partly integrated into the view rendering or view synthesis. For example, the view rendering or view synthesis may be configured to generate an up-scaled view which is then cropped afterwards. The scaling may thus be performed by the view rendering or synthesis. Moreover, instead of explicitly cropping image data of the views, the view rendering or view synthesis may be configured to omit generating such otherwise cropped image data. In general, any scaling for overscan may be performed before, during or after view rendering. Any scaling for overscan may be combined with one or more other scaling steps. It will be appreciated that various other ways of applying overscan are equally conceivable.

Figure 4:
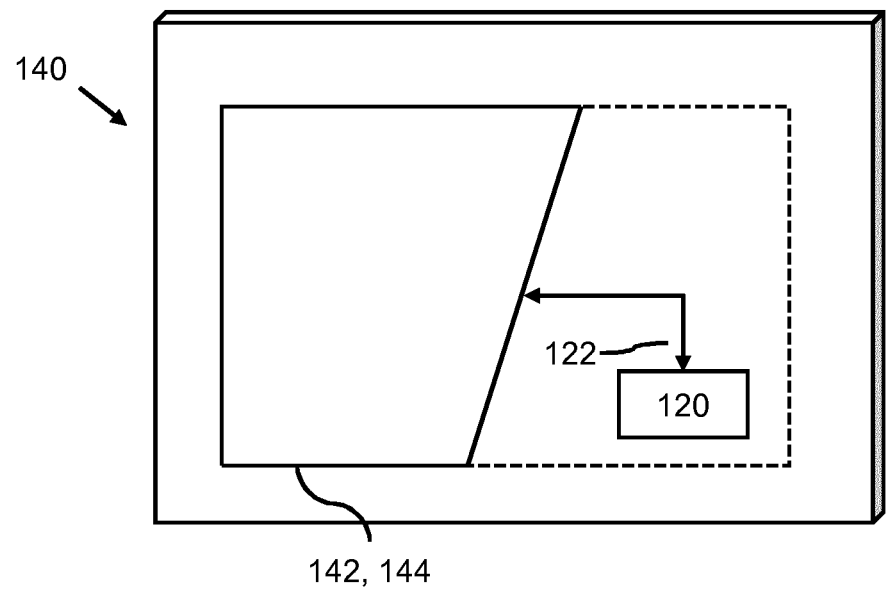
FIG. 4 shows the 3D display comprising the display processor.

FIG. 4 shows the display processor 120 in the form of an internal component of the 3D display 140 internally outputting data 122 of the generated series of views. In this figure, non-cited reference numerals correspond to those of FIG. 1. However, the display processor may also be embodied in or as a separate device, e.g., in or as a set-top box, personal computer, gaming console or similar device that is connectable to the 3D display. In general, the display processor may be implemented by a device or apparatus. The device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) of the display processor may be implemented in the device or apparatus in the form of programmable logic, e.g., as a Field-Programmable Gate Array (FPGA). In general, the display processor may be implemented as a circuit.

Figure 5:
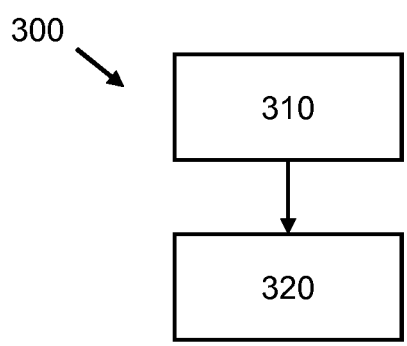
FIG. 5 shows a method for processing 3D image data.

FIG. 5 shows a computer-implemented method 300 for processing 3D image data for display on a 3D display. The method 300 may comprise, in a step titled "DETERMINING DEGREE OF OVERSCAN", determining 310 a degree of overscan to be used for displaying the series of views on the 3D display as a function of one or more depth range parameters, the one or more depth range parameters characterizing, at least in part, a degree of depth perceived by a viewer when the series of views is displayed on the 3D display. The method may further comprise, in a step titled "GENERATING SERIES OF VIEWS", on the basis of the determined degree of overscan, generating 320 the series of views of the 3D image data.

Figure 6:
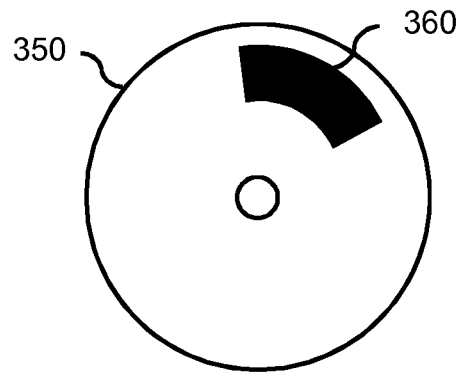
FIG. 6 shows a computer readable medium comprising non-transitory data representing instructions for a processor system to perform the method.

The method 300 may be implemented on a processor system, e.g., on a computer as a computer implemented method, as dedicated hardware, or as a combination of both. As also illustrated in FIG. 6, instructions for the computer, e.g., executable code, may be stored on a computer readable medium 350, e.g., in the form of a series 360 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 6 shows an optical disc 350.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A display processor for processing three-dimensional [3D] image data for display on a 3D display,
the 3D display being arranged for adjacently emitting a series of views of the 3D image data comprising two-dimensional [2D] image data and depth-related data, the series of views enabling stereoscopic viewing of the 3D image data at multiple viewing positions, wherein the display processor is configured to:
generate the series of views of the 3D image data;
use overscan for displaying the 3D image data on the 3D display so as to reduce or avoid de-occlusion artifacts at the bezels of the 3D display; and
determine a degree of the overscan as a function of one or more depth range parameters, the degree of the overscan providing a degree of cropping and scaling to be applied to the 2D image data, and the one or more depth range parameters characterizing, at least in part, a range of depth perceived by a viewer when the series of views is displayed on the 3D display,
wherein the one or more depth range parameters comprise one or more mapping parameters defining a mapping to be applied to values of the depth-related data when generating the series of view of the 3D image data, and the degree of overscan is determined based on said one or more mapping parameters.

2. The display processor according to claim 1, wherein the depth-related data includes depth-related values mapped to parallax shift values by which image data of the 2D image data is locally displaced across the series of views.

3. The display processor according to claim 1, wherein the mapping comprises a gain parameter and an offset parameter.

4. The display processor according to claim 3, wherein the display processor is configured to determine the degree of overscan as a function of a multiplicative product of a nominal overscan value and the gain parameter.

5. The display processor according to claim 4, wherein the display processor is configured to determine the degree of overscan as a sum of said multiplicative product and an absolute value of the offset parameter.

6. The display processor according to claim 1, wherein the one or more depth range parameters comprise one or more content parameters which are indicative of a depth range of the content of the 3D image data.

7. The display processor according to claim 6, wherein the one or more content parameters represent a measurement of the depth range of the content of the 3D image data.

8. The display processor according to claim 7, wherein the one or more content parameters are indicative of the depth range within an image and/or, if the 3D image data represents a 3D video, the depth range over multiple images.

9. The display processor according to claim 6, wherein the one or more content parameters are indicative of the depth range within a video shot.

10. A 3D display comprising the display processor according to claim 1.

11. A non-transitory computer readable medium comprising 3D image data and metadata associated with the 3D image data, the metadata representing the one or more content parameters as defined by claim 6.

12. A computer-implemented method of processing three-dimensional [3D] image data for display on a 3D display, the 3D display being arranged for adjacently emitting a series of views of the 3D image data comprising two-dimensional [2D] image data and depth-related data, the series of views enabling stereoscopic viewing of the 3D image data at multiple viewing positions, wherein the method comprises:
generating the series of views of the 3D image data;
using overscan for displaying the 3D image data on the 3D display so as to reduce or avoid de-occlusion artifacts at the bezels of the 3D display; and
determining a degree of the overscan as a function of one or more depth range parameters, the degree of the overscan providing a degree of cropping and scaling to be applied to the 2D image data, and the one or more depth range parameters characterizing, at least in part, a range of depth perceived by a viewer when the series of views is displayed on the 3D display,
wherein the one or more depth range parameters comprise one or more mapping parameters defining a mapping to be applied to values of the depth-related data when generating the series of views of the 3D image data, and the degree of overscan is determined based on said one or more mapping parameters.

13. A non-transitory computer readable medium comprising data representing instructions arranged to cause a processor system to perform the method according to claim 12.

14. The display processor according to claim 1, wherein the display processor is configured to determine the degree of overscan as a function of a multiplicative product of a nominal overscan value and a gain parameter controlling a magnitude of depth differences within the 3D image data.

15. An apparatus comprising:
an autostereoscopic three-dimensional [3D] display configured to adjacently emit a series of views of 3D image data, the series of views enabling stereoscopic viewing of the 3D image data at multiple viewing positions; and
a processor operationally coupled to the display and configured to:
generate the series of views of the 3D image data;
use overscan for displaying the 3D image data on the 3D display so as to reduce or avoid de-occlusion artifacts at the bezels of the 3D display; and
determine a degree of the overscan as a function of a multiplicative product of a nominal overscan value and a gain parameter controlling a magnitude of depth differences within the 3D image data.

16. The display processor according to claim 1, wherein the mapping includes a gain parameter and an offset parameter which are applied to a depth value when mapping the depth value to a parallax shift value during rendering of the 3D image data.

17. The display processor according to claim 1, wherein the degree of the overscan for displaying the 3D image data on the 3D display is changed dynamically so that the degree of overscan is increased with increase in the range of depth and decreased with a decrease in the range of depth.

* * * * *